(12) United States Patent
Funawatari et al.

(10) Patent No.: US 6,239,949 B1
(45) Date of Patent: May 29, 2001

(54) CASE FOR ACCOMMODATING DISC CARTRIDGE

(75) Inventors: Takatsugu Funawatari; Shuichi Kikuchi, both of Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/301,558

(22) Filed: Apr. 29, 1999

(30) Foreign Application Priority Data

May 18, 1998 (JP) .................................................. 10-135133

(51) Int. Cl.⁷ .............................. G11B 23/03; G11B 3/70
(52) U.S. Cl. ............................................ 360/133; 369/291
(58) Field of Search .............................. 369/291; 360/133

(56) References Cited

U.S. PATENT DOCUMENTS

| | | | |
|---|---|---|---|
| 5,415,291 | 5/1995 | Fukagawa | 206/308.3 |
| 5,450,952 | 9/1995 | Funawatari et al. | 206/308.3 |
| 5,531,322 | 7/1996 | Iwaki et al. | 206/308.3 |
| 5,540,328 | 7/1996 | Kohtake | 206/308.1 |
| 5,671,590 | 9/1997 | Funawatari et al. | 53/442 |
| 5,768,855 | 6/1998 | Funawatari et al. | 53/442 |
| 5,988,374 | 11/1999 | Funawatari et al. | 206/308.1 |

FOREIGN PATENT DOCUMENTS

| | | |
|---|---|---|
| 05042986 | 2/1993 | (JP) . |
| 05278772 | 10/1993 | (JP) . |

*Primary Examiner*—Allen T. Cao
(74) *Attorney, Agent, or Firm*—Ronald P. Kananen; Rader, Fishman & Grauer

(57) ABSTRACT

A case for accommodating a disc cartridge is disclosed which is capable of reliably protecting a disc and enabling the disc cartridge to easily be loaded/unloaded, which can arbitrarily be designed and the cost of which can be reduced. The case for accommodating a disc cartridge incorporates: a frame formed by integrating first and second frames disposed opposite to each other and a connection member for connecting the base portions of the first and second frames to each other; and a cover formed by integrating first and second cover plates which are inserted into a space between the first and second frames to be opposite to each other and a connecting cover member for connecting the base portions of the first and second cover plates to each other. The frame is made of the synthetic resin having excellent impact resistance as compared with the cover. The cover is made of the synthetic resin having light permeability.

14 Claims, 13 Drawing Sheets

CASE FOR ACCOMMODATING DISC CARTRIDGE

BACKGROUND OF THE INVENTION

1. Field of the Invention

The present invention relates to a case for accommodating a disc cartridge which accommodates a disc for use as a recording medium, such as an optical disc or a magnetic disc, on which information signals are recorded.

2. Description of the Related Art

Hitherto, a case for accommodating a disc cartridge has been employed which accommodates a disc cartridge which accommodates a disc for use as a recording medium when the disc cartridge is not loaded into a disc recording and/or reproducing apparatus.

The disc cartridge accommodating a disc has a recording and/or reproducing opening for causing a portion of a signal recording region of the disc to be exposed to the outside. The disc cartridge has a shutter arranged to close the opening so as to protect the accommodated disc from damage caused from dust or foreign matter introduced into the cartridge through the opening during storage of the disc cartridge.

If the shutter is accidentally operated during storage of the disc cartridge and thus the recording and/or reproducing opening is opened, introduction of dust or foreign matters cannot be prevented.

Therefore, a case for accommodating a disc cartridge has been employed in order to prevent undesirable opening of the recording and/or reproducing opening owning to accidental operation of the shutter during the storage of the disc cartridge. Moreover, the case protects the accommodated disc from great shock caused from a drop or the like of the disc cartridge.

As a case of the foregoing type, the applicant of the present invention has disclosed a case in Japanese Patent Laid-Open No. 5-42986. The disclosed case is manufactured by folding a sheet made of a synthetic resin or the like into a bag shape. The foregoing case cannot realize sufficiently great mechanical strength. If a great shock is administered owning to a drop or the like, there is apprehension that the shock is administered to the accommodated disc cartridge and thus the disc cartridge is damaged.

The operation for bending the sheet to form the case cannot accurately be performed. Therefore, the foregoing case cannot reliably accommodate and hold the disc cartridge. Thus, there is apprehension that the accommodated case is dropped.

To solve the above-mentioned problem and reliably accommodate and protect the disc cartridge, the applicant of the present invention has disclosed a case for accommodating a disc cartridge in Japanese Patent Laid-Open No. 5-278772. The disclosed case incorporates a ceiling plate joined opposite to a rectangular bottom plate of a case body which has peripheral walls stood erect on the bottom plate. An opening for injecting/ejecting the disc cartridge is provided for a side surface of the case body.

The case disclosed in Japanese Patent Laid-Open No. 5-278772 can be made of a material with which the case body and the ceiling plate have sufficiently great mechanical strength. Therefore, a disc cartridge which must be accommodated in the case can reliably be protected. To improve the impact resistance of the disclosed case, the case body is made of an ABS (Acrylonitrile Butadiene Styrene) resin or a Hi-PS (High Impact Polystyrene) resin having high impact resistance. The foregoing synthetic resins are opaque resins in general. Therefore, if the overall body of the case is made of the foregoing synthetic resin, the inside portion of the case cannot be seen through the case body. As a result, the type of the accommodated disc cartridge cannot easily be detected.

To solve the above-mentioned problem, that is, to enable the inside portion to be seen through while satisfactory impact resistance is realized, a case has been disclosed which incorporates a ceiling plate made of a transparent PS (Polystyrene) resin or a transparent AS (Acrylonitrile Styrene) resin.

If only the ceiling plate is made of the transparent material, the upper and lower surfaces of the accommodated disc cartridge cannot be seen through the case. Therefore, sufficient confirmation of the accommodated disc cartridge cannot easily be performed.

To enable the accommodated disc cartridge to be confirmed from any direction, a case has been disclosed which incorporates a case body which is as well as made of the transparent PS resin or the AS resin. When the overall body of the case is made of the transparent PS resin or the AS resin, satisfactory impact resistance cannot be obtained. If a shock is administered to the case owning to a drop or the like, the case is easily broken. As a result, the accommodated disc cartridge cannot reliably be protected.

To enable the accommodated disc cartridge to be confirmed from any direction while satisfactory impact resistance is maintained, a case has been disclosed which incorporates a case body and a ceiling plate made of a PC (PolyCarbonate) resin or the transparent ABS resin which is a transparent resin having satisfactory impact resistance. Since the foregoing resins are costly resins, the cost of the material, however, is enlarged. As a result, the manufacturing cost is enlarged excessively.

To reliably protect the disc cartridge and enable the accommodated disc cartridge to easily be confirmed from outside, the material of the above-mentioned conventional case for accommodating a disc cartridge is limited. Since the materials which can be employed is limited, a case cannot freely be designed.

SUMMARY OF THE INVENTION

Accordingly, an object of the present invention is to provide a case for accommodating a disc cartridge which is capable of reliably protecting an accommodated disc cartridge, permitting arbitrary design to be performed, which can easily be operated and, the cost of which can be reduced.

To achieve the above-mentioned object, according to one aspect of the present invention, there is provided a case for accommodating a disc cartridge comprising: a frame formed by integrating first and second frames disposed opposite to each other and a connection member for connecting the base portions of the first and second frames to each other; a cover formed by integrating first and second cover plates which are inserted into a space between the first and second frames to be opposite to each other and a connecting cover member for connecting the base portions of the first and second cover plates to each other; pairwise first and second parallel insertion grooves provided for opposite surfaces of the first and second frames and formed in the lengthwise direction of the first and second frames such that the first and second insertion grooves are opened at positions adjacent to the base portions of the first and second frames and provided with insertion limiting portions formed adjacent to the leading ends of the first and second frames; insertion portions provided for two opposite sides of the first and second cover plates so as to be inserted and engaged to the first and second insertion grooves; engaging means incorporating opposite engaging projections and engaging holes which are arranged to be engaged to one another and which are provided for insertion portions and the first and second frames, respectively, the insertion portions being formed on the two opposite sides of the first and second cover plates and arranged to be inserted and engaged to the first and second insertion grooves; and cartridge holding portions provided for the opposite surfaces of the first and second frames, wherein the first and second cover plates are joined to a space between the first and second frames by inserting the two opposite insertion portions formed on the two sides of the first and second cover plates and by bringing the engaging means of the insertion portions and the first and second frames to be positioned opposite to one another so as to be engaged to one another, and the connection cover member provided adjacent to the base portions of the first and second cover plates covers the connection member when the first and second cover plates have been inserted into the space between the first and second frames.

The case according to the present invention incorporates the frame formed by integrating first and second frames disposed opposite to each other and a connection member for connecting the base portions of the first and second frames to each other; a cover formed by integrating first and second cover plates which are inserted into a space between the first and second frames to be opposite to each other and a connecting cover member for connecting the base portions of the first and second cover plates. Therefore, each of the frame and the cover can be made of an optimum material.

The frame may be made of a synthetic resin having impact resistance superior to that of the cover, while the cover may be made of a synthetic resin having light permeability.

The first and second cover plates are joined to the frame by inserting the two opposite insertion portions formed on the two sides of the first and second cover plates and by bringing the engaging means of the insertion portions and the first and second frames to be positioned opposite to one another so as to be engaged to one another. Therefore, assembly of the case can easily be performed.

The cover joined to the frame to constitute the case for accommodating a disc cartridge can reliably be joined to the frame because the connection cover member provided adjacent to the base portions of the first and second cover plates is located to cover the connection member when the first and second cover plates have been inserted into the space between the first and second frames.

The engaging projections constituting the engaging means provided for the insertion portions and the first and second frames are provided for the insertion portions, first engaging guide portions are formed at the leading ends of the first and second cover plates in the direction in which the first and second cover plates are inserted, and first separation preventive walls are provided for the base portions of the first and second cover plates, the base portions being opposite to the direction of insertion. Therefore, an operation for inserting the first and second cover plates into the frame can easily be performed. Moreover, separation of the cover from the frame can be prevented.

The engaging projections provided for the insertion portions are provided for the surfaces of the insertion portions which are in parallel with the outer surfaces of the first and second cover plates, and the engaging holes arranged to be engaged to the engaging projections are provided for outer plan walls which constitute the first and second insertion grooves, second engaging guide portions are formed on the sides of the first and second cover plates having the engaging projections so as to guide relative engagement between the engaging projections and the engaging holes in a direction perpendicular to the direction in which the first and second cover plates are inserted into the frame, and second separation preventive walls are formed on the sides opposite to the sides on which the second engaging guide portions are formed. Therefore, when the first and second frames are deflected and deformed in directions in which they are moved apart from each other, the engaging projections and the engaging holes can easily be engaged to one another. Moreover, the deflection of each of the first and second frames in the directions in which they are moved apart from each other can be prevented.

The connection member of the frame is formed to exert force for urging the first and second cover plates in a direction opposite to the direction of insertion of the first and second cover plates which have been joined to the frame by engaging the engaging means provided between the insertion portions and the first and second frames to each other. Therefore, an error which is made when the engaging means has been engaged as described above can be absorbed. Thus, accurate locating can be performed when the cover is joined to the frame.

A stepped portion is provided for an outer surface of each of the first and second cover plate so that the thickness of each of the insertion portions is smaller than the thickness of each of the first and second cover plates. Therefore, the first and second cover plates and the frame can be joined to each other without formation of a large stepped portion.

A stepped portion is provided for each of opposite side ends of the connection member of the frame, the stepped portion having a thickness which is substantially the same as the thickness of each of the first and second cover plates which are inserted into a space between the first and second frames. Therefore, the first and second cover plates can be inserted into the frame from a position adjacent to the connection member.

Cartridge holding grooves for holding two opposite side surfaces of a disc cartridge which is accommodated in the case for accommodating a disc cartridge in the lengthwise direction of the first and second frames are formed in the opposite surfaces of the first and second frames, and the cartridge holding portions are formed in the cartridge holding grooves. Therefore, a disc cartridge can be accommodated without any contact with the first and second cover plates. Moreover, a space for accommodating printed matter can be created between the first and second cover plates and the disc cartridge.

A support-means insertion groove for enabling support means of an accommodating apparatus to be engaged is formed in the outer side surface of each of the first and second frames in the lengthwise direction of the first and second frames. Therefore, the cases according to the present invention can be accommodated in the accommodating apparatus having a multistage accommodating portion such that the cases are arranged.

The cartridge holding portions are formed by providing portions expanded in opposite directions for portions of side walls of the first and second frames, and recesses formed opposite to the expanded portions are used as engaging portions for engaging and holding portions provided for the accommodating apparatus. Therefore, separation of the accommodated case from the accommodating apparatus can be prevented.

A portion on which a label is applied is provided for the outer surface of the connection member of the cover. Therefore, the contents of the accommodated disc cartridges can be indicated.

Other objects, features and advantages of the invention will be evident from the following detailed description of the preferred embodiments described in conjunction with the attached drawings.

DESCRIPTION OF THE PREFERRED EMBODIMENTS

A case for accommodating a disc cartridge according to the present invention will now be described with reference to the drawings.

The accommodating case according to the present invention accommodates a disc cartridge which accommodates a disc which is a recording medium, for example, an optical disc or a magneto-optical disc, for recording information signals.

Figure 1:
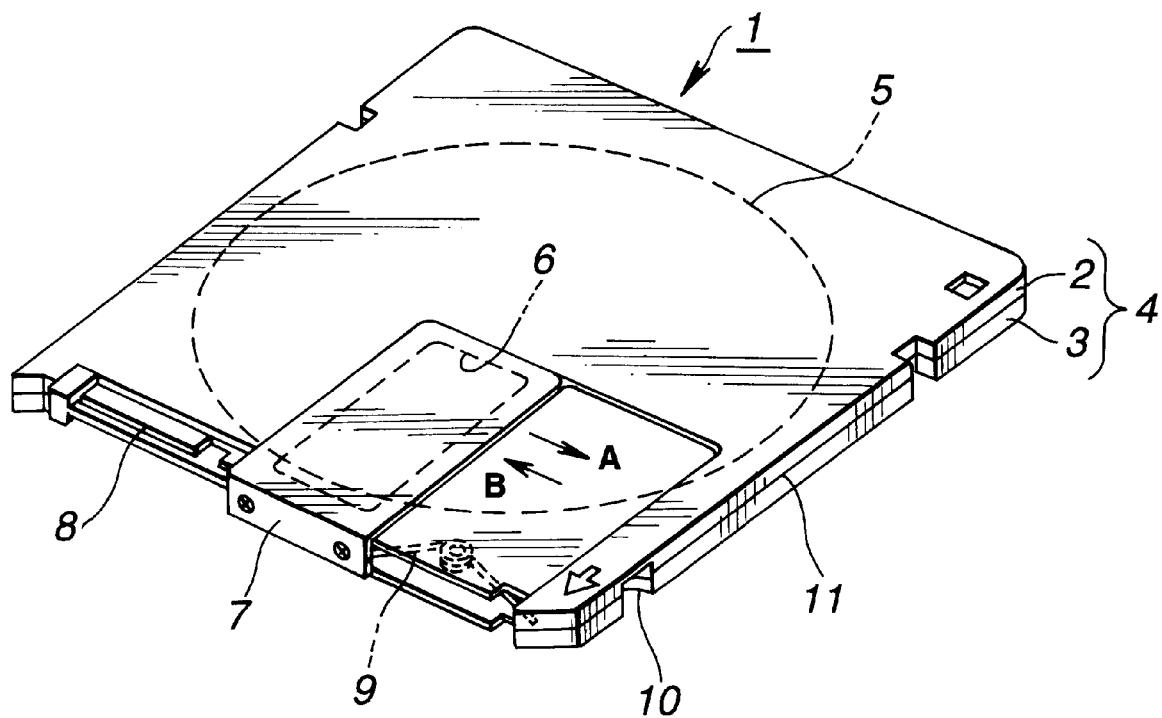
FIG. 1 is a perspective view showing a disc cartridge which is accommodated in a case for accommodating a disc cartridge according to the present invention.

A disc cartridge 1 which is accommodated in the accommodating case to be described later, as shown in FIG. 1, incorporates a cartridge body 4 formed by abutting, against each other, pairwise upper and lower half members 2 and 3 made of a synthetic resin. The cartridge body 4 accommodates an optical disc 5. A recording and/or reproducing opening 6 is formed in the upper and lower surfaces of the cartridge body 4, the opening 6 being formed to expose a signal recording region of the optical disc 5 to the outside in the radial direction of the optical disc 5.

A shutter 7 arranged to open and/or close the opening 6 and having a cross sectional shape in the form of a U-shape facing side is engaged to the cartridge body 4 from a front position. The shutter 7 is joined to a slider 8 movably joined to the front surface of the cartridge body 4 so that the shutter 7 is able to move in directions which is indicated by arrows A and B shown in FIG. 1 and in which the opening 6 is opened/closed. The shutter 7 is always urged by a torsion coil spring 9 in the direction which is indicated by the arrow B shown in FIG. 1 and in which the opening 6 is closed. However, the shutter 7 is able to move against the urging force of the torsion coil spring 9 in the direction which is indicated by the arrow A shown in FIG. 1 and in which the opening 6 is opened. When force against the urging force of the torsion coil spring 9 for moving the shutter 7 in the direction indicated by the arrow A shown in FIG. 1 is exerted, the shutter 7 is forcibly moved in the direction in which the opening 6 is opened.

Engaging recesses 10 for loading the disc cartridge 1 are formed on the two sides of the front surface of the cartridge body 4 to which the shutter 7 has been joined. The engaging recesses 10 are used to load the disc cartridge 1 into a disc recording and/or reproducing apparatus. As shown in FIG. 1, each of the engaging recesses 10 is formed such that its upper end portion formed in the upper half member 2 is closed and its side portion formed in the lower half member 3 is opened.

Figure 2:
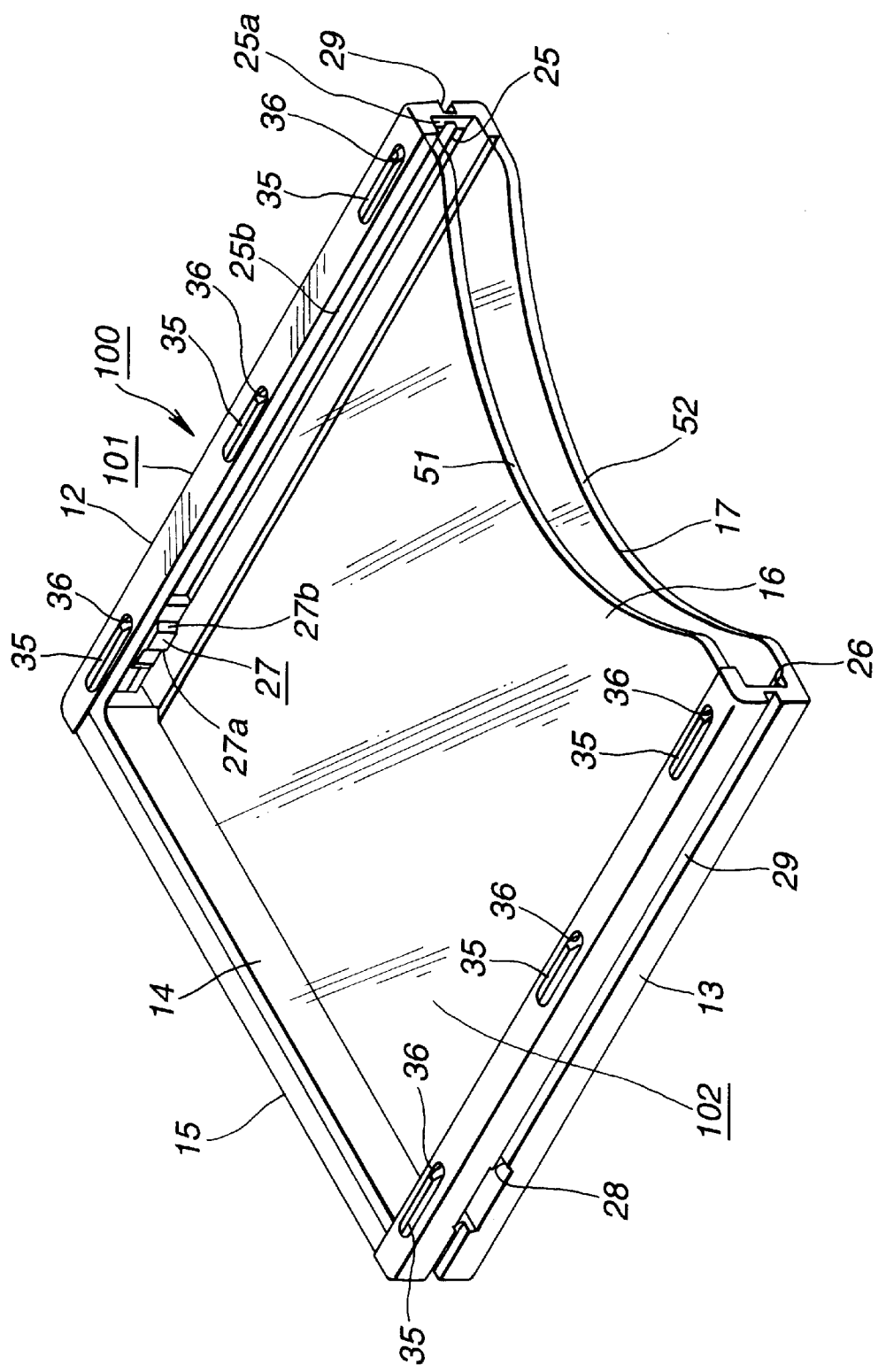
FIG. 2 is a perspective view showing the accommodating case.
Figure 3:
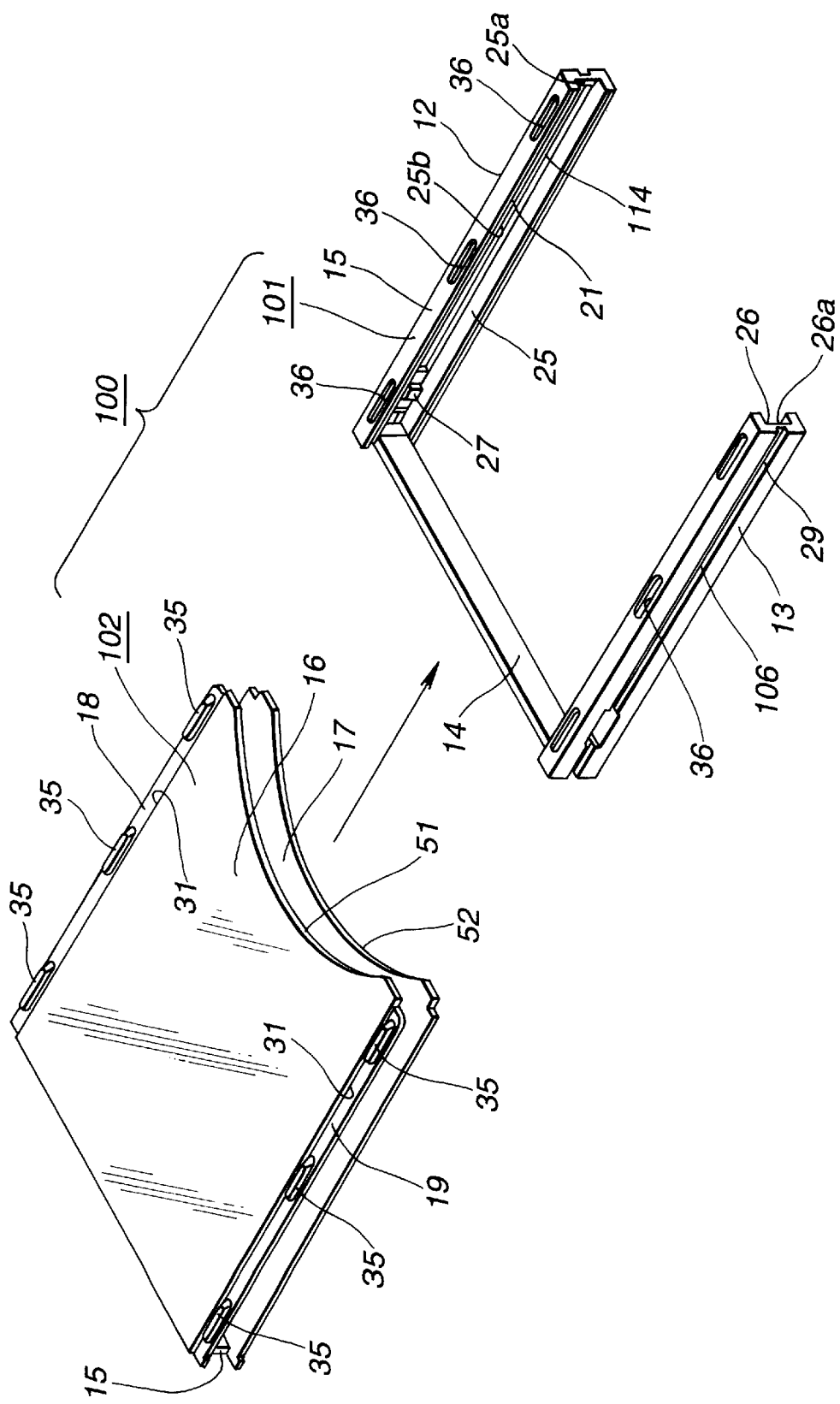
FIG. 3 is an exploded perspective view showing the accommodating case.

The structure of an accommodating case 100 according to the present invention and arranged to accommodate the disc cartridge 1 having the above-mentioned structure will now be described. As shown in FIGS. 2 and 3, the accommodating case 100 incorporates a frame 101 formed by integrating first and second frames 12 and 13 disposed opposite to each other and extending in parallel with each other and a connection member 14 for connecting base portions of the first and second frames 12 and 13 to each other. Moreover, the accommodating case 100 incorporates a cover 102 formed by integrating first and second opposite cover plates 16 and 17 which are inserted into a space between the first and second frames 12 and 13 and a connection cover member 15 for connecting base portions of the first and second cover plates 16 and 17 to each other.

Figure 5:
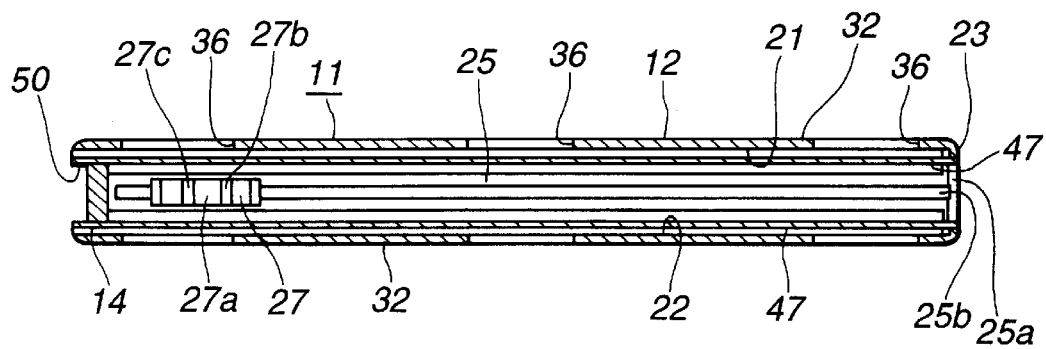
FIG. 5 is a vertical cross sectional view showing a frame which constitutes the accommodating case.
Figure 6:
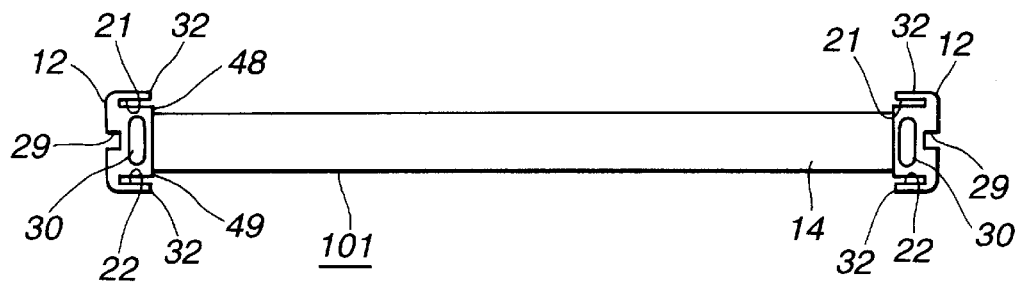
FIG. 6 is a rear view showing the frame.

As shown in FIGS. 3 and 5, first and second insertion grooves 21 and 22, into which insertion portions 18 and 19 formed on the two opposite side surfaces of the first and second cover plates 16 and 17 are inserted and engaged, are formed in the opposite inner surfaces of the first and second frames 12 and 13 which constitute the frame 101. The first and second insertion grooves 21 and 22 are parallel grooves formed in substantially the overall lengthwise direction from the base portions to the leading ends of the first and second frames 12 and 13 which are connected to each other by the connection member 14. The portions of the first and second frames 12 and 13 adjacent to the base portions are opened, while the portions adjacent to the leading end are closed. The opened ends adjacent to the base portions are portions for inserting the insertion portions 18 and 19, while the closed leading ends are formed into insertion-position limiting portions 23 and 24 for stopping the inserted insertion portions 18 and 19, as shown in FIGS. 5 to 7.

Figure 7:
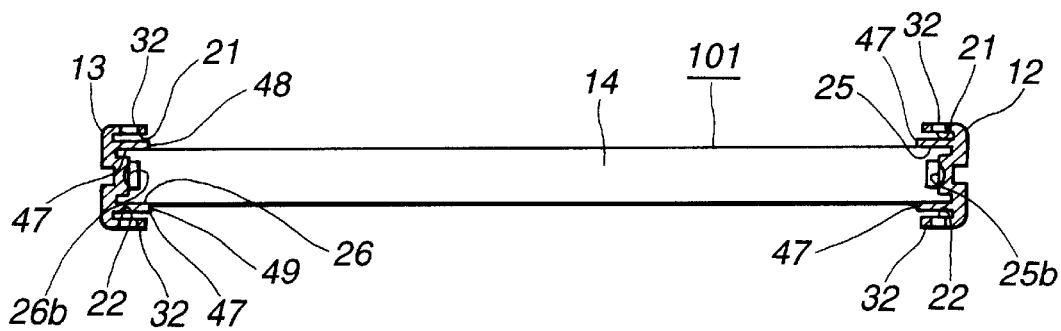
FIG. 7 is a horizontal cross sectional view showing the frame.

The opposite inner surfaces of the first and second frames 12 and 13, as shown in FIGS. 5 and 7, have cartridge holding grooves 25 and 26. The opposite two side surfaces of the disc cartridge 1, which is accommodated in the accommodating case 100, are inserted into the cartridge holding grooves 25 and 26 so that the disc cartridge 1 is held by the cartridge holding grooves 25 and 26. The cartridge holding grooves 25 and 26 are formed between the first and second insertion grooves 21 and 22 to extend in substantially the overall lengthwise direction from the leading ends of the first and second frames 12 and 13 to the base portions of the same. As shown in FIG. 5, the cartridge holding grooves 25 and 26 are formed such that their portions adjacent to the leading ends of the first and second frames 12 and 13 are opened. Moreover, the portions of the first and second frames 12 and 13 adjacent to the base portions of the first and second frames 12 and 13 are closed by the connection member 14. The opened ends adjacent to the leading ends of the first and second frames 12 and 13 are portions from which the disc cartridge 1 is inserted. The closed ends of the first and second frames 12 and 13 closed by the connection member 14 are portions al which the inserted disc cartridge 1 is stopped.

Inclined guide surfaces 25a and 26a for guiding the widthwise portions of the disc cartridge 1 are provided for portions adjacent to the opened ends of the cartridge holding grooves 25 and 26 at which the inserted disc cartridge 1 is stopped. Thus, introduction of the disc cartridge 1 can easily be performed.

Relief grooves 25b and 26b are formed in substantially the widthwise central portion of the cartridge holding grooves 25 and 26. The relief grooves 25b and 26b prevent undesirable contact of parting surfaces 11 formed owning to an error in the contact of the disc cartridge 1 with the contact portions of the upper and lower half members 2 and 3. As a result, when the disc cartridge 1 is accommodated in the accommodating case 100 or when the disc cartridge 1 is ejected from the accommodating case 100, or when vibrations are created during an accommodating operation, the undesirable contact of the parting surface 11 of the disc cartridge 1 with the cartridge slide surfaces of the cartridge holding grooves 25 and 26 can be prevented. As a result, undesirable scraping of the cartridge slide surfaces by the parting surface 11 can be prevented. Thus, dust caused from scraping can be prevented.

Figure 8:
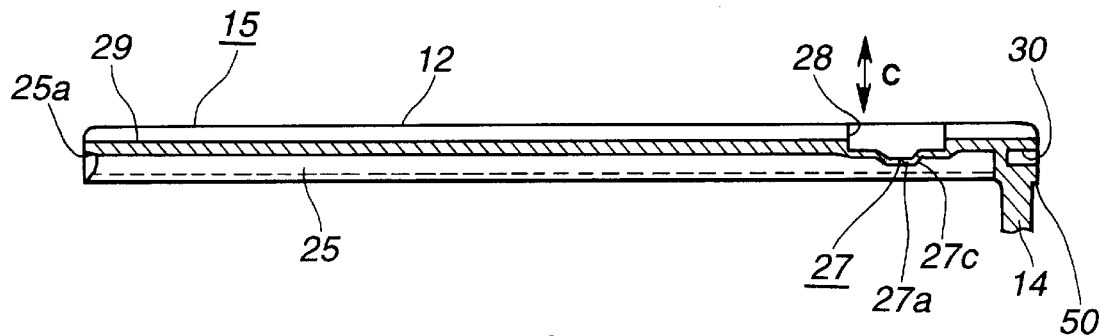
FIG. 8 is a plan cross sectional view showing the frame having first and second frames each of which is provided with a cartridge holding portion.

As shown in FIG. 5, cartridge holding portions 27 are formed adjacent to the base portions of the first and second frames 12 and 13. The cartridge holding portions 27 are arranged to be engaged to engaging recesses 10 provided for the opposite two side surfaces of the disc cartridge 1, which is accommodated in the accommodating case 100 so as to prevent separation of the disc cartridge 1. As shown in FIGS. 2, 7 and 8, the cartridge holding portions 27 are formed to expand into the cartridge holding grooves 25 and 26.

Figure 9:
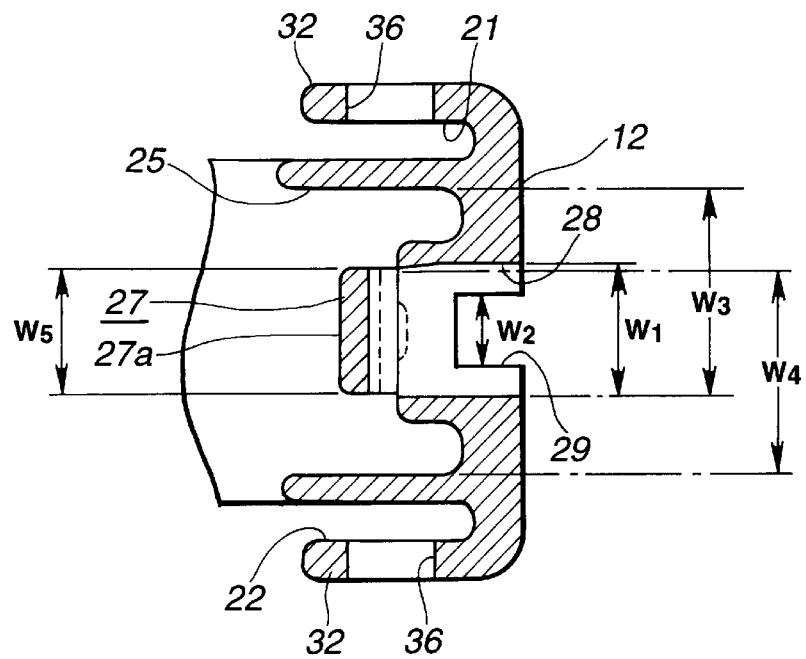
FIG. 9 is a horizontal cross sectional view showing a portion of each of the first and second frames provided with the cartridge holding portion.

As shown in FIGS. 8 and 9, the cartridge holding portions 27 are integrally formed with the first and second frames 12 and 13 such that holes 28 are formed in portions of the first and second frames 12 and 13. Thus, only the two side surfaces of the cartridge holding portions 27 in the direction in which the disc cartridge 1 is loaded/unloaded with respect to the cartridge holding grooves 25 and 26 are connected to the first and second frames 12 and 13. Engaging projections 27a maximally projecting into the cartridge holding grooves 25 and 26 are provided for the central portions of the cartridge holding portions 27. When the engaging recesses 10 of the disc cartridge 1 and the engaging projections 27a are engaged to one another, the cartridge holding portions 27 having the above-mentioned structure can easily be deformed in a direction which is indicated by an arrow C shown in FIG. 8 and which is perpendicular to the direction in which the disc cartridge 1, which is haunted in the engaging recesses 10, is loaded/unloaded. As shown in FIG. 8, engagement guide surfaces 27b and 27c inclined in the direction in which the disc cartridge 1 is loaded/unloaded are formed on the two sides of the engaging projections 27a. The engagement guide surfaces 27b and 27c enable the engaging recesses 10 of the disc cartridge 1 and the engaging projections 27a to smoothly be engaged to each other.

As shown in FIGS. 5 and 9, the cartridge holding portions 27 are formed in substantially the widthwise directional central portions of the cartridge holding grooves 25 and 26. As shown in FIG. 9, the width $W_3$ of each of the cartridge holding portions 27 from the upper surface of each of the cartridge holding grooves 25 and 26 to the lower surface of each of the cartridge holding portions 27 is smaller than the width $W_5$ of each of the engaging recesses 10 provided for the disc cartridge 1. Moreover, the width $W_4$ from the lower surface of each of the cartridge holding grooves 25 and 26 to the upper surface of each of the cartridge holding portions 27 is smaller than the width $W_5$. Since the cartridge holding portions 27 are formed as described above, the disc cartridge 1 can easily be engaged to the engaging recesses 10 having the closed portion formed in the upper half member 2 and formed from the lower half member 3 to the side surface even if the disc cartridge 1 is turned upside down when it is inserted into the accommodating case 100.

The cartridge holding portions 27 provided for the first and second frames 12 and 13 of the frame 101 are structured such that the width $W_5$ of the cartridge holding portions 27 is smaller than the width $W_1$ of the through holes 28, as shown in FIG. 9. Thus, the side surfaces of the through holes 28 can be inclined. Also a mold for molding the cartridge holding portions 27 can be inclined so that the strength of the mold can be increased.

Figure 10:
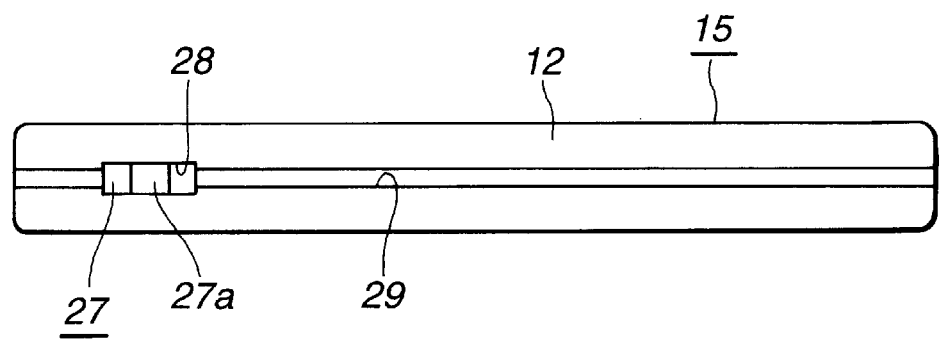
FIG. 10 is a side view showing the frame.

The outer side surfaces of the first and second frames 12 and 13 have support-member engaging grooves 29 to which engagement support members provided for the accommodating apparatus for accommodating the accommodating cases 100 are engaged, as shown in FIGS. 2 and 10. The accommodating cases 100 are made to be in parallel with each in the form of a multistage when they are accommodated in the accommodating apparatus. The support-member engaging grooves 29 are formed in the overall lengthwise direction of the first and second frames 12 and 13. Two ends of each of the support-member engaging grooves 29 adjacent to the base portions and leading ends of the first and second frames 12 and 13 are opened. Since the two ends are opened as described above, flexibility of insertion into the accommodating apparatus can be maintained.

The surfaces of the base portions of the first and second frames 12 and 13 adjacent to the rear portion of the frame 101 have insertion holes 30 which can be engaged to support projections provided for the accommodating apparatus.

The through holes 28 and the support-member engaging grooves 29 for forming the cartridge holding portions 27 are formed to overlap in the widthwise directional central portions of the first and second frames 12 and 13, as shown in FIG. 8. The width $W_1$ of each of the through holes 28 is made to be larger than the width $W_2$ of each of the support-member engaging grooves 29. Therefore, the through holes 28 are able to serve as engaging portions which are engaged to case engagement holding portions provided for the accommodating apparatus to locate the insertion position of the accommodating case 100, which is accommodated in the accommodating apparatus, so as to prevent separation of the accommodating case 100.

Figure 13:
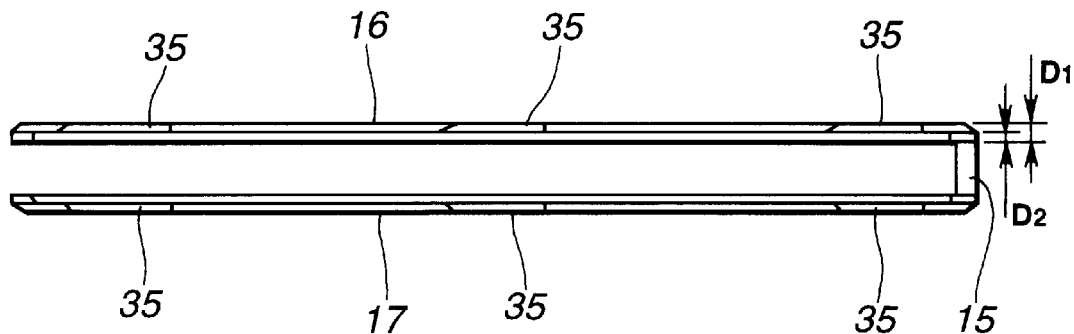
FIG. 13 is a side view showing the cover.
Figure 14:
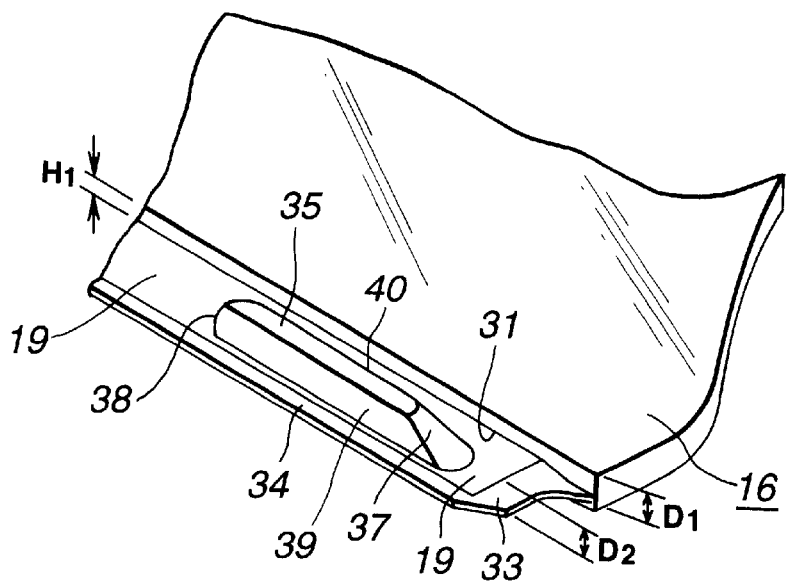
FIG. 14 is a perspective view showing an insertion portion and the engaging projection.
Figure 21:
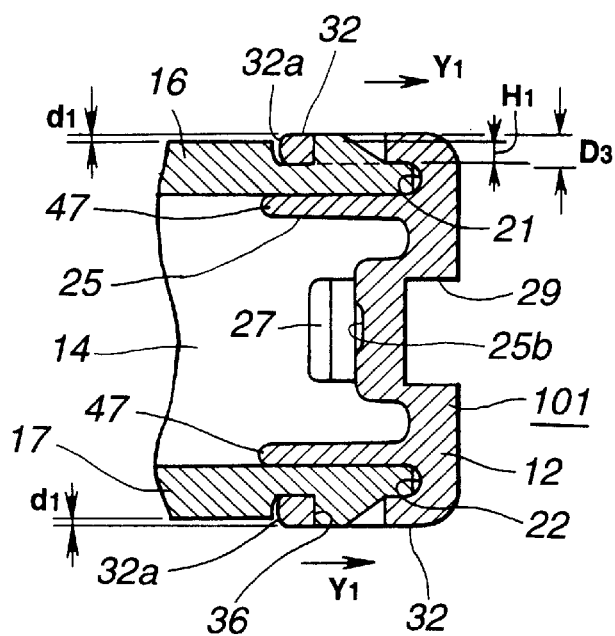
FIG. 21 is a horizontal cross sectional view showing a state in which the engaging projections and the engaging holes have been engaged to one another.

The cover 102 having the first and second cover plates 16 and 17 which are inserted and held by the frame 101 structured as described above, as shown in FIGS. 3 and 11, is provided with insertion portions 18 and 19 on the two opposite sides thereof. The insertion portions 18 and 19 are inserted into the first and second insertion grooves 21 and 22 of the first and second frames 12 and 13 so as to be engaged to the first and second insertion grooves 21 and 22. Each of the insertion portions 18 and 19 has the thickness $D_2$ which is smaller than the thickness $D_1$ of each of the first and second cover plates 16 and 17 as shown in FIGS. 13 and 14 by providing stepped portions 31 for the outer surfaces of the first and second cover plates 16 and 17. The stepped portions 31 provided for forming the insertion portions 18 and 19 absorb or adjust stepped portions formed between plan walls 32 facing the outer surface of the first and second frames 12 and 13 constituting the first and second insertion grooves 21 and 22 and the surfaces of the first and second cover plates 16 and 17. The stepped portions are formed when the insertion portions 18 and 19 have been inserted and engaged to the first and second insertion grooves 21 and 22. That is, when the frame 101 and the cover 102 have been joined to each other, the surfaces of the plan walls 32 which constitute the first and second frames 12 and 13 of the cover 102 are higher than the surfaces of the first and second cover plates 16 and 17 of the cover 102 by a small height of $d_1$, as shown in FIG. 21.

As shown in FIG. 14, first and second insertion guide portions 33 and 34 formed into inclined surfaces are provided for the leading ends of the insertion portions 18 and 19 in the direction of insertion into the frame 101 and side surfaces which are in parallel with the insertion direction. The first and second insertion guide portions 33 and 34 facilitate insertion of the insertion portions 18 and 19 into the first and second insertion grooves 21 and 22.

Figure 11:
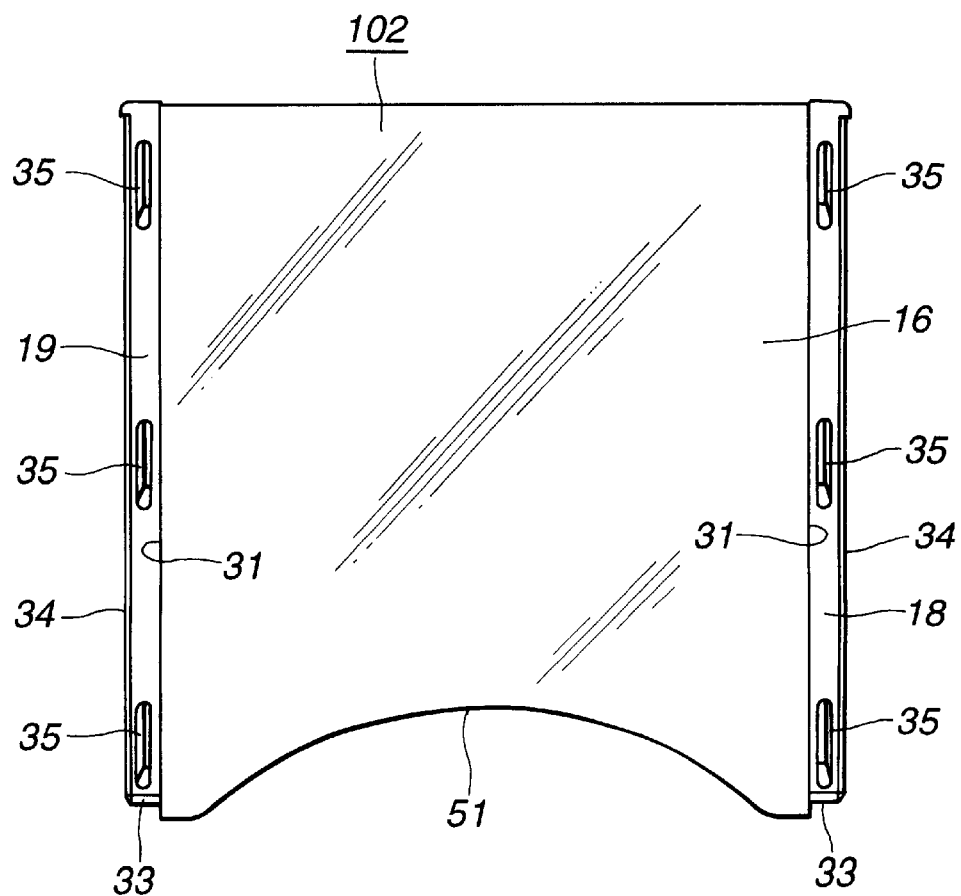
FIG. 11 is a plan view showing a cross sectional view which constitutes the case for accommodating a disc cartridge according to the present invention.

As shown in FIGS. 11 and 14, the first insertion guide portions 33 are formed at positions somewhat rearward from the leading ends of the first and second cover plates 16 and 17. As a result, the cover 102 is joined to the frame 101, that is, the first and second insertion portions 18 and 19 are inserted into the first and second insertion grooves 21 and 22 of the first and second frames 12 and 13. Thus, the first insertion guide portions 33 are brought into contact with the insertion-position limiting portions 23 and 24. In the foregoing case, the leading end surfaces of the first and second frames 12 and 13 project over the leading end surfaces of the first and second cover plates 16 and 17 by a small distance of $d_2$.

A plurality of engaging projections 35 are formed on the outer surfaces of the first and second cover plates 16 and 17 having the stepped portions 31 of the insertion portions 18 and 19. The engaging projections 35 constitute an engaging mechanism for preventing separation of the first and second cover plates 16 and 17 inserted into the spaces between the first and second frames 12 and 13 from the frame 101. The engaging projections 35 are engaged to engaging holes 36 formed in the plan walls 32 of the first and second frames 12 and 13 constituting the first and second insertion grooves 21 and 22. As shown in FIGS. 3 and 13, the plural engaging projections 35 are formed in the direction in which the first and second cover plates 16 and 17 are inserted into the frame 101. Specifically, three engaging projections 35 are, as shown in FIG. 13, formed at the leading end of the insertion of the first and second cover plates 16 and 17 into the frame 101, in substantially the central portion and in the base portion.

Also the engaging holes 36 are formed in the lengthwise direction of the first and second frames 12 and 13 to correspond to the engaging projections 35, as shown in FIG. 3.

Figure 15:
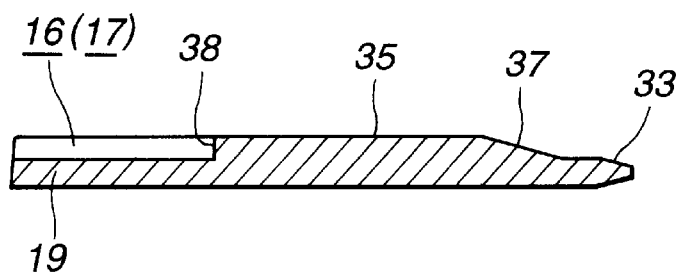
FIG. 15 is a vertical cross sectional view showing the engaging projection provided for the cover plate.

The engaging projections 35 incorporate first engagement guide portions 37 at the leading ends of the insertion of the first and second cover plates 16 and 17 into the frame 101. The first engagement guide portions 37 guide the engagement to the engaging holes 36. As shown in FIGS. 14 and 15, the first engagement guide portions 37 are formed into inclined surface which are gradually inclined from the leading ends of the insertion into the first and second insertion grooves 21 and 22 toward the base portions. As shown in FIG. 15, first separation preventive walls 38 stood erect on the surfaces of the insertion portions 18 and 19 are formed on the portions of the base portions opposite to the surfaces on which the first engagement guide portions 37 of the engaging projections 35 are formed. The first separation preventive walls 38 are brought into contact with the vertical inner surfaces of the engaging holes 36 when the engaging projections 35 have been engaged to the engaging holes 36. Thus, separation of the engaging projections 35 from the engaging holes 36 is prevented.

Figure 16:
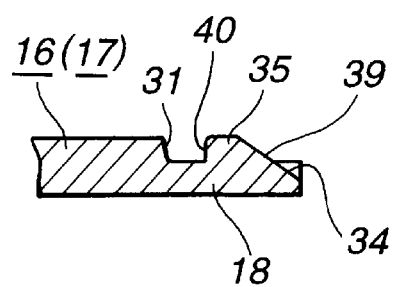
FIG. 16 is a horizontal cross sectional view showing the engaging projection provided for the cover plate.

As shown in FIG. 16, second engagement guide portions 39 for guiding engagement with the engaging holes 36 in the direction perpendicular to the insertion of the first and second cover plates 16 and 17 into the frame 101 are provided for the surfaces of the engaging projections 35 adjacent to the side surfaces of the first and second cover plates 16 and 17. The second engagement guide portions 39 are formed into inclined surfaces which are inclined from the base portions of the engaging projections 35 toward the leading ends of the same. As shown in FIG. 16, second separation preventive walls 40 stood erect from the surfaces of the insertion portions 18 and 19 are formed on the surfaces of the engaging projections 35 opposite to the surfaces on which the second engagement guide portions 39 are formed. The second separation preventive walls 40 are brought into contact with the vertical inner surfaces of the engaging holes 36 when the engaging projections 35 have been engaged to the engaging holes 36 so as to prevent separation of the engaging projections 35 from the engaging holes 36.

As described above, the second engagement guide portions 39 and the second separation preventive walls 40 are provided for the surfaces of the engaging projections 35 which are in parallel with the insertion direction of the first and second insertion grooves 21 and 22. Therefore, when the first and second frames 12 and 13 are deflected and deformed in the directions in which they are moved apart from one another, the second engagement guide portions 39 serve as guides. Thus, the engaging projections 35 and the engaging holes 36 can easily be engaged to one another. After the engagement has been established, the second separation preventive walls 40 are brought into contact with the inner surfaces of the engaging holes 36. Thus, separation of the engaging projections 35 from the engaging holes 36 can be prevented.

Figure 12:
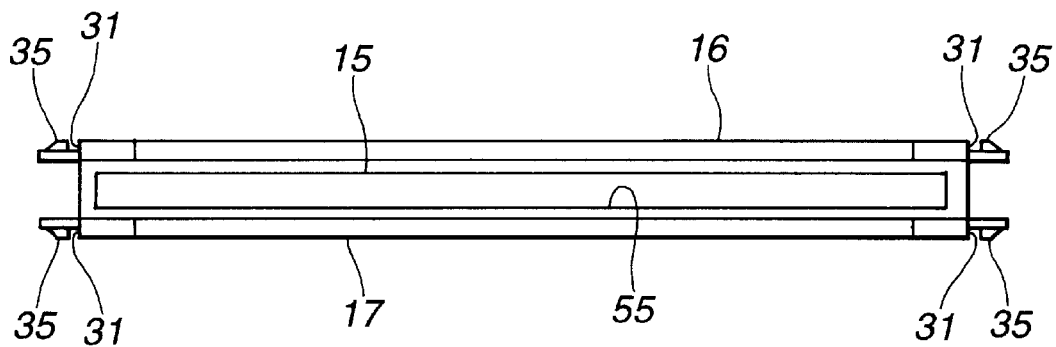
FIG. 12 is a rear view showing the cover.

As shown in FIGS. 12 and 13, connection cover members 43 are provided for the base portions of the first and second cover plates 16 and 17. The connection cover members 43 are brought into contact with the rear surface of the connection member 14 of the frame 101 after the first and second cover plates 16 and 17 have been joined to the frame 101. The connection cover members 43 connect the first and second cover plates 16 and 17 to one another and as well as constitute the rear wall of the accommodating case 100. As shown in FIG. 13, the cover 102 is formed into a U-like shape facing side by the first and second cover plates 16 and 17 and the connection cover member 15.

As shown in FIGS. 6 and 7, stepped portions 48 and 49 are provided for the opposite vertical ends of the connection member 14 which constitutes the frame 101. The stepped portions 48 and 49 are formed lower than the surfaces of thin walls 47 which constitute the first and second insertion grooves 21 and 22 in cooperation with the outer plan walls 32 of the first and second frames 12 and 13 and on which the insertion portions 18 and 19 are placed. The stepped portions 48 and 49 prevent abrasion occurring when the inner surfaces of the first and second cover plates 16 and 17 are brought into contact with the connection member 14 in a process for inserting the first and second cover plates 16 and 17 into the first and second frames 12 and 13.

Figure 4:
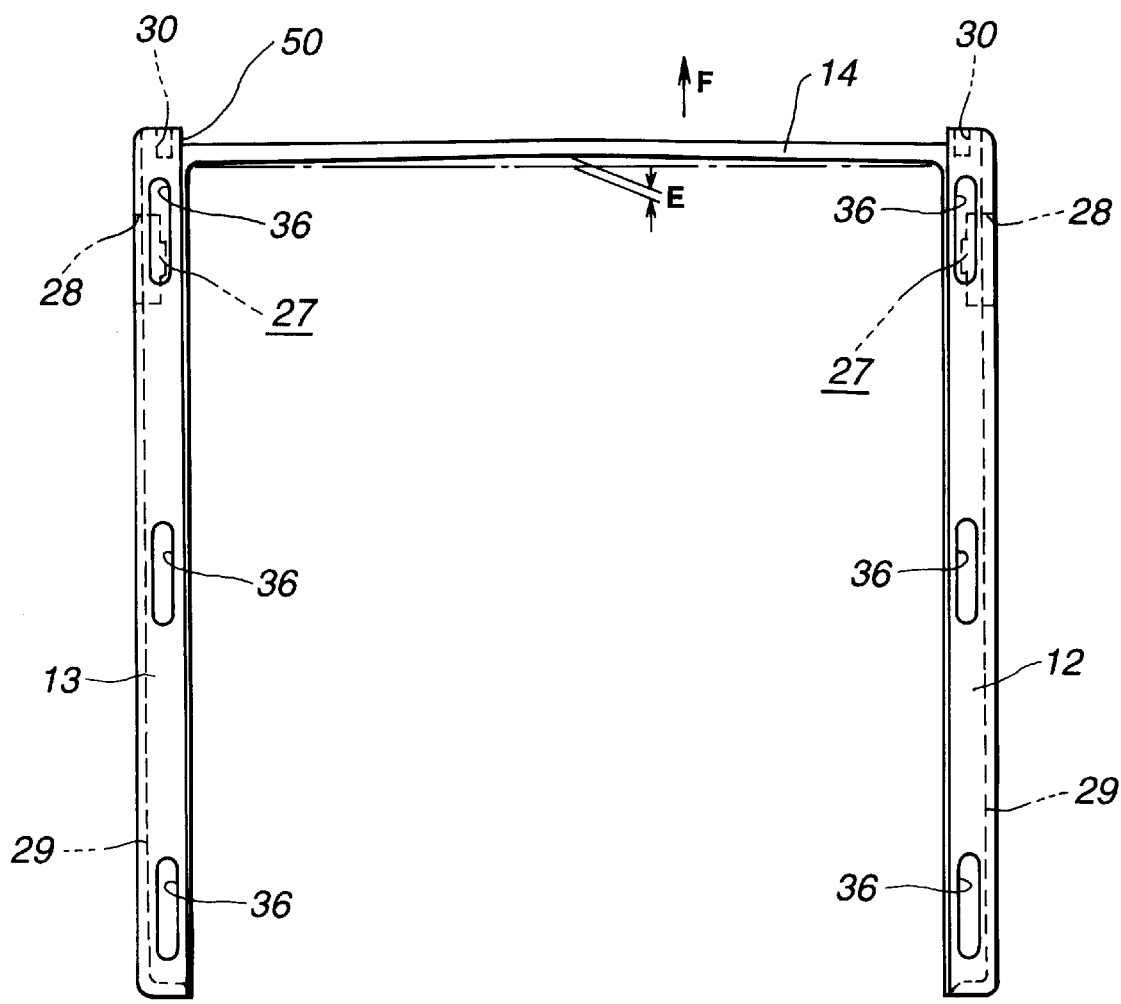
FIG. 4 is a plan view showing a frame which constitutes the accommodating case.

As shown in FIGS. 4 and 8, the connection member 14 connects the first and second frames 12 and 13 to each other at positions inner than the base ends of the first and second frames 12 and 13 for a distance corresponding to the stepped portions 50. The stepped portions 50 are slightly larger than the thickness of the connection cover member 15 of the cover 102. When the frame 101 and the cover 102 are joined to each other, the base ends of the first and second frames 12 and 13 slightly project over the outer surface of the connection cover member 15 by a small distance of $d_2$.

The connection member 14 of the frame 101 is, as shown in FIG. 4, curved such that the lengthwise directional central portion outwards expands. That is, the connection member 14 is curved to outwards expand for a distance expressed by an arrow E show in FIG. 15 over the positions to which the connection cover members 43 of the first and second cover plates 16 and 17, which are located and joined to the space between the first and second frames 12 and 13, are extended. Since the connection member 14 is curved, force for urging the connection cover member 15 of the first and second cover plates 16 and 17 which are located and joined to the space between the first and second frames 12 and 13 is exerted. The urging force is exerted in a direction opposite to the direction which is indicated by an arrow F shown in FIG. 4 and in which the first and second cover plates 16 and 17 are inserted into the frame 101.

As shown in FIGS. 3 and 11, cut recesses 51 and 52 in the form of circular arcs are formed in the leading end portions of the first and second cover plates 16 and 17. The cut recesses 51 and 52 constitute holding portion for projecting a portion of the rear portion of the disc cartridge 1 which is accommodated in the accommodating case 100 when the accommodating case 100 has been formed.

An operation for assembling the frame 101 and cover 102 to form the accommodating case 100 will now be described.

The process for assembling the accommodating case 100 will now be described with reference to FIG. 3. The first insertion guide portions 33 formed at the leading ends of the insertion portions 18 and 19 provided for the two sides of the first and second cover plates 16 and 17 which constitute the cover 102 are inserted into the opened ends of the first and second insertion grooves 21 and 22 facing the base portions of the first and second frames 12 and 13, as shown in FIG. 3. Then, the first and second cover plates 16 and 17 are pushed into the spaces between the first and second frames 12 and 13. Moreover, the insertion portions 18 and 19 are inserted into the first and second insertion grooves 21 and 22.

As described above, the insertion portions 18 and 19 incorporate the first insertion guide portions 33 at the leading ends thereof. Moreover, the second insertion guide portions 34 are provided for the side portions of the insertion portions 18 and 19. Therefore, the insertion portions 18 and 19 can easily be inserted into the first and second insertion grooves 21 and 22. Each of the first and second insertion grooves 21 and 22 has the thickness which is substantially the same as the thickness of each of the insertion portions 18 and 19 to enable the insertion portions 18 and 19 to closely be engaged to the first and second insertion grooves 21 and 22.

Figure 17:
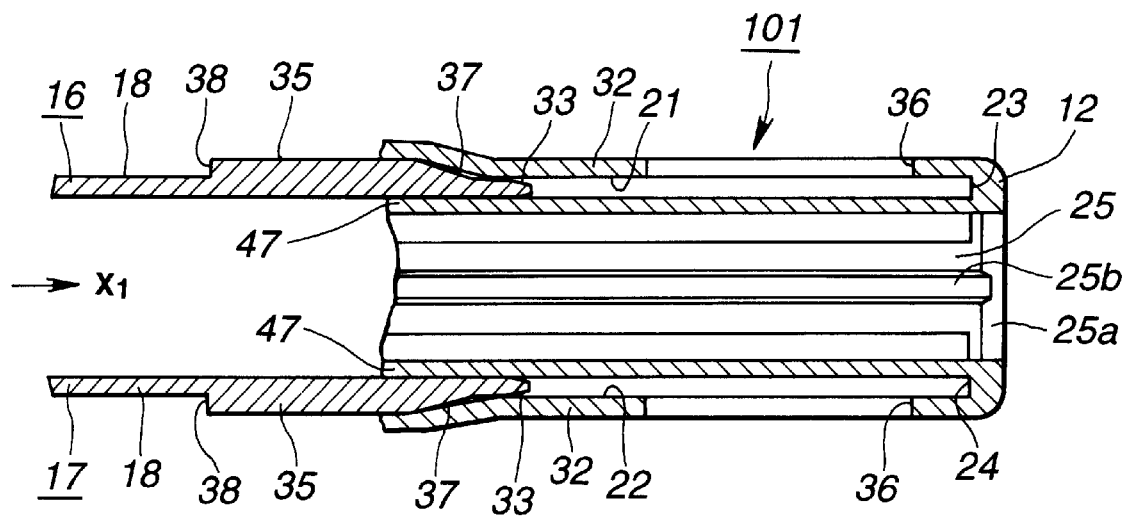
FIG. 17 is a partial cross sectional view showing a state in which the first and second cover plates of the cover are inserted into the frame.

When the insertion portions 18 and 19 are inserted into the first and second insertion grooves 21 and 22, the engaging projections 35 expand the first and second insertion grooves 21 and 22. As shown in FIG. 17, the first engagement guide portions 37 provided for the leading end portions of the engaging projections 35 and formed into the inclined surfaces serve as wedges to expand the first and second insertion grooves 21 and 22. Therefore, the insertion portions 18 and 19 can easily be inserted into the first and second insertion grooves 21 and 22.

Figure 18:
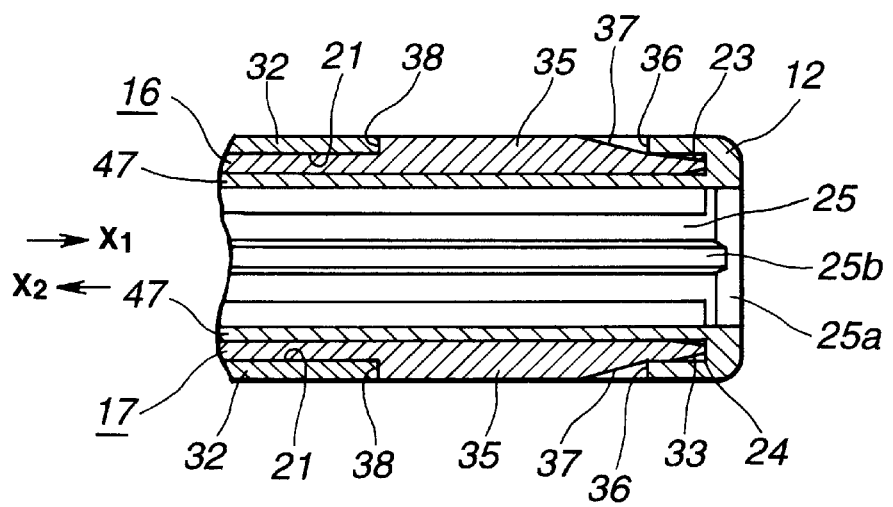
FIG. 18 is a partial cross sectional view showing a state in which the first and second cover plates of the cross sectional view have been inserted into the frame and, thus, the engaging projections and the engaging holes have been engaged to one another.

In a state in which the insertion portions 18 and 19 have been inserted into the first and second insertion grooves 21 and 22, the first and second cover plates 16 and 17 are furthermore inserted toward the leading ends of the first and second frames 12 and 13 in a direction indicated by an arrow $X_1$ shown in FIG. 17. As a result, the first engagement guide portions 37 formed at the leading end portions of the engaging projections 35 face the opened ends of the engaging holes 36. When the insertion portions 18 and 19 are furthermore inserted into the first and second insertion grooves 21 and 22, the engaging projections 35 are guided by the first engagement guide portions 37 so as to be engaged to the corresponding engaging holes 36, as shown in FIG. 18. The leading end portions of the first and second insertion grooves 21 and 22 are closed at this time. Therefore, further insertion of the insertion portions 18 and 19 in the direction indicated by the arrow $X_1$ shown in FIG. 18 is prevented. That is, the insertion portions 18 and 19 are brought into contact with the insertion-position limiting portions 23 and 24. Thus, insertion of the insertion portions 18 and 19 into the direction indicated by the arrow $X_1$ shown in FIG. 17 is prevented.

The leading ends of the first and second insertion grooves 21 and 22 are closed by the insertion-position limiting portions 23 and 24. Therefore, the leading end surfaces of the first and second frames 12 and 13 can be formed into flat surfaces, as shown in FIG. 2. Therefore, the appearance of the accommodating case 100 can be improved.

Thus, the first and second cover plates 16 and 17 are inserted into the frame 101 until the engaging projections 35 are engaged to the engaging holes 36. As a result, the connection cover member 15 provided for the positions adjacent to the base portions press and come in contact with the connection member 14 to be inwards deformed in a direction indicated by an arrow $X_1$ shown in FIG. 19, the connection member 14 being curved to expand outwards.

The connection member 14 is pressed in the direction opposite to the direction of expansion when the first and second cover plates 16 and 17 have been inserted into the frame 101. Therefore, the connection member 14 urges the first and second cover plates 16 and 17 in a direction which is indicated by an arrow $X_2$ shown in FIG. 18 and which is opposite to the direction of insertion into the frame 101. The first and second cover plates 16 and 17 are urged in a direction indicated by an arrow $X_2$ shown in FIG. 19 by the connection member 14 through the connection cover member 15. Thus, also the engaging projections 35 are urged in the direction indicated by the arrow $X_2$ shown in FIG. 18. As a result, the first separation preventive walls 38 provided for the base portions are pressed against the inner surfaces of the engaging holes 36. Therefore, strong engagement to the engaging holes 36 can be realized.

Figure 20:
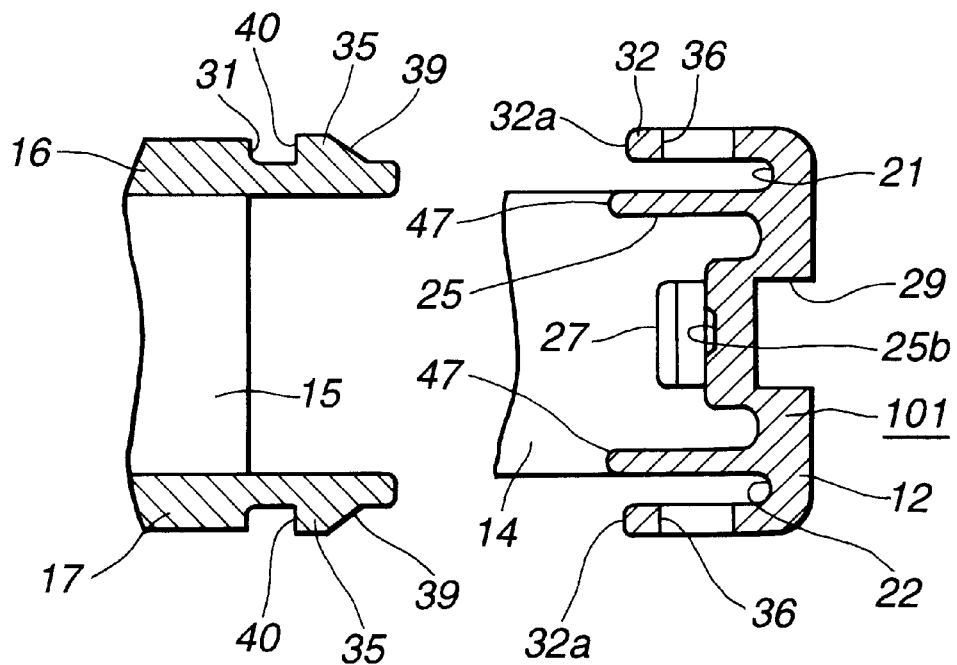
FIG. 20 is a horizontal cross sectional view showing a state before the engaging projections and the engaging holes are engaged to one another.

As shown in FIGS. 20 and 21, when the engaging projections 35 have been engaged to the engaging holes 36, the second separation preventive walls 40 stood erect on the surfaces of the insertion portions 18 and 19 are made to be opposite to the vertical inner surfaces of the engaging holes 36. Therefore, if force is exerted on the first and second frames 12 and 13 in a direction which is indicated by an arrow $Y_1$ shown in FIG. 21 and in which the first and second frames 12 and 13 are moved apart from each other, separation of the engaging projections 35 from the engaging holes 36 can be prevented. The reason for this is that the second separation preventive walls 40 are brought into contact with the vertical inner surfaces of the engaging holes 36. As a result, the first and second cover plates 16 and 17 of the cover 102 can reliably be integrated with the frame 101.

When the first and second frames 12 and 13 are moved away from each other in the direction indicated by the arrow $Y_1$ shown in FIG. 21, the engaging projections 35 are separated from the engaging projections 35. Even in the foregoing case, the engaging projections 35 can easily be engaged to the engaging holes 36 because the inclined second engagement guide portions 39 can be used as the guide when the first and second frames 12 and 13 are deflected in the direction in which they move closer to each other.

Figure 19:
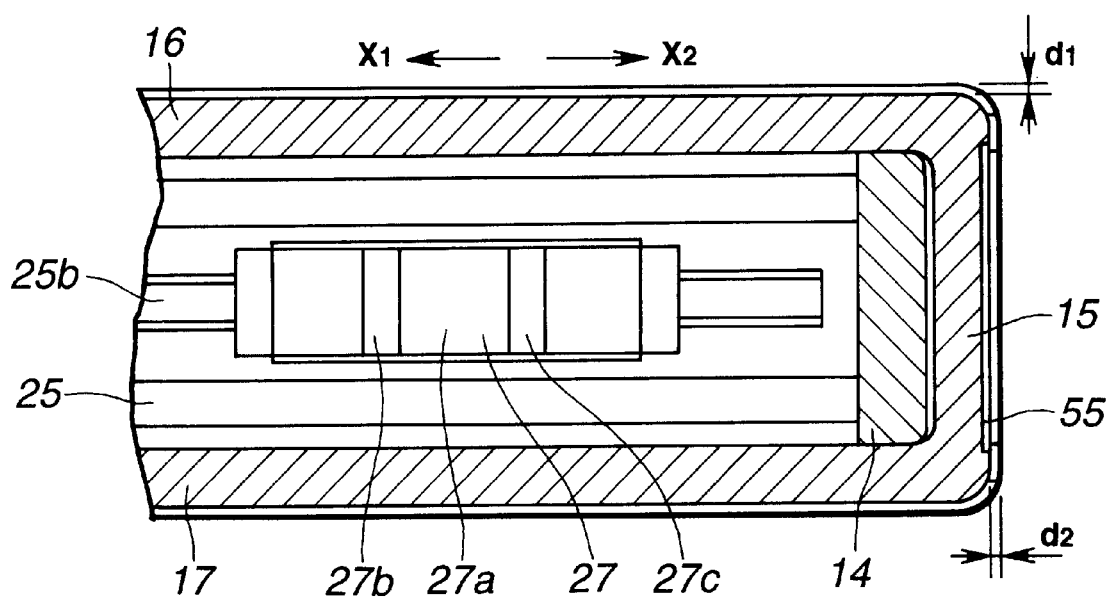
FIG. 19 is a vertical cross sectional view showing a rear portion of the case for accommodating a disc cartridge in a state in which the first and second cover plates have been joined to the frame.

As shown in FIG. 19, the height $H_1$ of each of the stepped portions 31 formed on the two sides of the first and second cover plates 16 and 17 for the purpose of forming the insertion portions 18 and 19 is made to be smaller than the thickness $D_3$ of the plan walls 32 which constitute the first and second insertion grooves 21 and 22. Therefore, when the first and second cover plates 16 and 17 have been joined to the frame 101 to assemble the accommodating case 100, the plan walls 32 are able to project over the two side surfaces of the first and second cover plates 16 and 17 for the distance $d_1$, as shown in FIGS. 2 and 21. Since the two sides of the first and second cover plates 16 and 17 are made to project as described above, the first and second cover plates 16 and 17 can be protected from damage if a plurality of the accommodating case 100 are stacked or the accommodating case 100 is placed on the surface of a desk.

As described above, curved chamfered portions 32a are provided for the leading end portion of the plan walls 32, as shown in FIGS. 9 and 21. Therefore, if a gap is formed between each of the plan walls 32 and each of the stepped portions 31 adjacent to the insertion portions 18 and 19, foreign matter is not caught by the leading end of the plan wall 32. Thus, deformation of the plan wall 32 can be prevented. As a result, the state of engagement between the engaging projections 35 and the engaging holes 36 can reliably be maintained.

As described above, the first and second cover plates 16 and 17 of the cover 102 are inserted into the frame 101 so that the accommodating case 100 is formed as shown in FIG. 2. Therefore, assembly can easily be performed. Since the urged first and second cover plates 16 and 17 can be joined to the frame 101, the accommodating case 100 can be formed which incorporates the frame 101 and the cover 102 which are reliably integrated with each other.

Moreover, the accommodating case 100 has the structure that the surface of the frame 101 is higher than the surface of the cover 102. The frame 101 is higher than each of the upper and lower surfaces of the accommodating case 100 by the distance of $d_1$. The frame 101 is higher than each of the front and rear surfaces of the accommodating case 100 by the distance of $d_2$. Therefore, if the accommodating case 100 is rubbed against, for example, the surface of a desk, the cover 102 can be protected from damage. If the accommodating case 100 is, by mistake, dropped from an upper position, the impact of the drop can be absorbed by the frame 101. Therefore, the cover 102 can be protected from damage.

Figure 22:
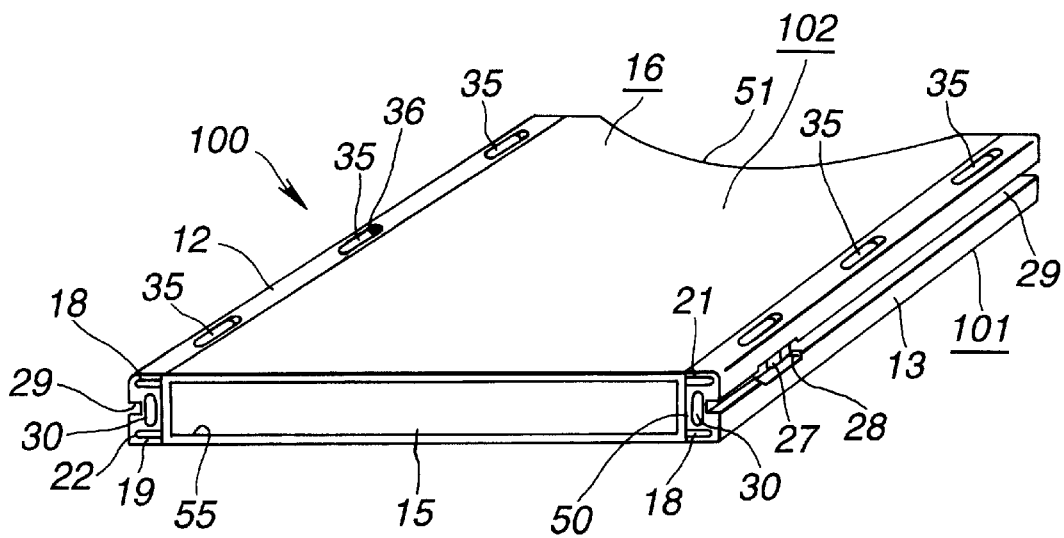
FIG. 22 is a perspective view showing a rear portion of the case for accommodating a disc cartridge according to the present invention.

As shown in FIG. 22, a portion 55 to which a label is applied is provided for the rear surface of the accommodating case 100 having the above-mentioned structure. The portion 55 is a portion to which a label indicating the contents or the type of the disc cartridge 1 is applied. The portion 55 to which a label is applied is formed by providing a recess for the rear surface of the connection cover member 15 which is brought into contact with the connection member 14 to constitute the rear wall of the accommodating case 100. It is preferable that the portion 55 to which a label is applied is formed to have a depth corresponding to the thickness of a label which must be applied to the portion 55 to which a label is applied.

Figure 23:
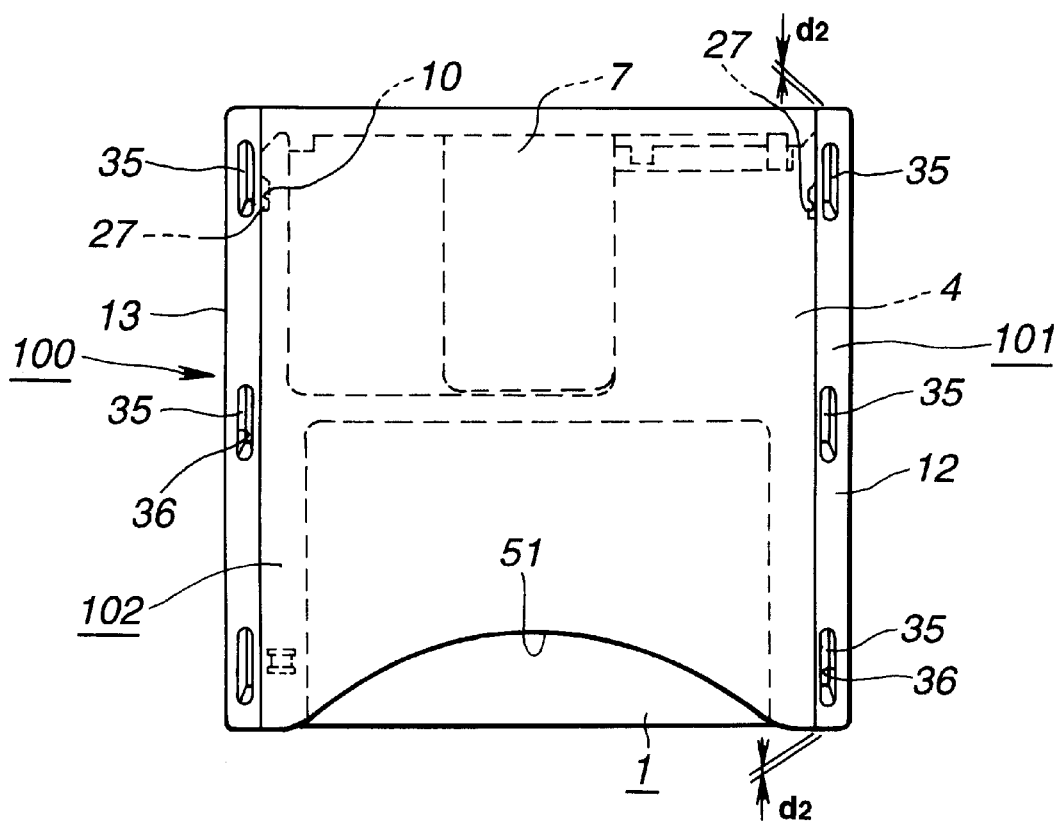
FIG. 23 is a plan view showing a state in which a disc cartridge has been accommodated in the case for accommodating a disc cartridge according to the present invention.

To accommodate the disc cartridge 1 in the accommodating case 100 having the above-mentioned structure, the front surface to which the shutter 7 has been joined is used as the leading end of the insertion. Thus, the disc cartridge 1 is inserted through an insertion opening 56 formed in the front surface provided with the cut recesses 51 and 52 of the first and second cover plates 16 and 17. At this time, the two side portions of the disc cartridge 1 are engaged to the cartridge holding grooves 25 and 26 formed in the inner surfaces of the first and second frames 12 and 13. The disc cartridge 1 accommodated in the accommodating case 100 is guided by the cartridge holding grooves 25 and 26 so as to be accommodated in the accommodating case 100. When the disc cartridge 1 has completely been accommodated in the accommodating case 100 as shown in FIG. 23, the cartridge holding portions 27 of the accommodating case 100 are engaged to the engaging recesses 10 formed on the two sides of the disc cartridge 1. Since the cartridge holding portions 27 are engaged to the engaging recesses 10, the disc cartridge 1 can be accommodated in the accommodating case 100 such that separation from the accommodating case 100 can be prevented.

The portions of the disc cartridge 1 accommodated in the accommodating case 100 which are exposed to the outside through the cut recesses 51 and 52 are held and discharged. Thus, the disc cartridge 1 can be ejected from the accommodating case 100. When the disc cartridge 1 is ejected from the accommodating case 100, the cartridge holding portions 27 are deformed toward the outsides of the first and second frames 12 and 13 so as to be removed from the engaging recesses 10.

Figure 24:
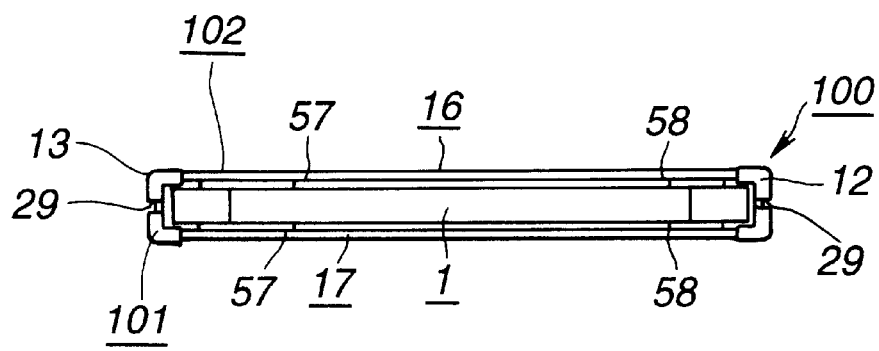
FIG. 24 is a front view showing a state in which a disc cartridge and printed matter have been accommodated in the case for accommodating a disc cartridge according to the present invention.

The accommodating case 100 according to the present invention incorporates the thin walls 47 formed between the first and second insertion grooves 21 and 22 and the cartridge holding grooves 25 and 26. The thin walls 47 constitute the first and second insertion grooves 21 and 22 and the cartridge holding grooves 25 and 26. As shown in FIG. 24, the spaces corresponding to the thickness of the thin walls 47 are created between the inner surfaces of the first and second cover plates 16 and 17 and the disc cartridge 1. In this state, the first and second cover plates 16 and 17 have been joined to the frame 101 which incorporates the first and second insertion grooves 21 and 22 to which the insertion portions 18 and 19 have been engaged. Moreover, the two side portions of the disc cartridge 1 are held by the cartridge holding grooves 25 and 26 after the disc cartridge 1 has been accommodated. Therefore, in the accommodating case 100 according to the present invention, the spaces are created between the first and second cover plates 16 and 17 and the disc cartridge 1 held by the cartridge holding grooves 25 and 26. The foregoing spaces are used as the printed-matter accommodating portions 57, as shown in FIG. 24. Printed matter 58, such as a booklet, having, for example, printed contents recorded on the optical disc 5 accommodated in the accommodating case 100 is accommodated in each of the printed-matter accommodating portions 57.

The thickness of each of the printed-matter accommodating portions 57 can be changed by arbitrarily changing the thin walls 47.

The accommodating case 100 according to the present invention has the support-member engaging grooves 29 formed on the two opposite side surfaces of the frame 101 thereof. Therefore, the accommodating case 100 can be accommodated in the accommodating apparatus, which is capable of accommodating the accommodating cases 100 which are in parallel in a multistage state. In this case, the support-member engaging grooves 29 are engaged to the engagement support members provided for the accommodating apparatus. Therefore, the accommodating cases 100 can be arranged and accommodated in the accommodating apparatus.

The accommodating case 100 according to the present invention can be stood erect when they are accommodated in the accommodating apparatus by engaging the insertion holes 30 provided for the base portions of the first and second frames 12 and 13 to support projections provided for the accommodating apparatus.

The accommodating case 100 has the structure that the frame 101, which constitutes the peripheral wall of the accommodating case 100, and the cover 102, which is positioned opposite to the surface of the disc cartridge 1 which is accommodated in the accommodating case 100, are formed independently. Therefore, the frame 101 and the cover 102 can be made of materials which are optimum materials to obtain the corresponding functions.

Therefore, the accommodating case 100 according to the present invention has the structure that the frame 101 for constituting the outer wall is made of a synthetic resin having impact resistance superior to that of the cover 102. The synthetic resin having excellent impact resistance may be an ABS (Acrylonitrile-Butadien-Styrene) resin, a PP (PolyPropylene) resin or a POM (Polyacetal) resin.

To enable the disc cartridge 1 accommodated in the accommodating case 100 to be seen through, the cover 102 is made of a synthetic resin having light permeability. For example, a transparent PS (PolyStyrene) resin, an AS (Acrylonitrile-Styrene) resin or a PC (PolyCarbonate) resin may be employed.

The accommodating case 100 according to the present invention has the structure the frame 101, which constitutes the outer wall, and the cover 102, which are joined to the frame 101, are independently formed. The material selectivity of the cover 102 constituting the first and second cover plates 16 and 17 which constitute the main surface of the accommodating case 100 can be improved such that satisfactory mechanical strength of the accommodating case 100 can be maintained. Therefore, the accommodating case 100 for the disc cartridge 1 can easily be formed into a required shape.

The foregoing accommodating case 100 incorporates the engaging projections 35 provided for the first and second cover plates 16 and 17. Moreover, the engaging holes 36 are formed in the frame 101. A converse structure may be employed. Another structure may be employed in which the engaging projections 35 are provided for the side portions of the insertion portions 18 and 19. Moreover, the engaging holes 36 are provided for the side surfaces of the first and second frames 12 and 13.

The case for accommodating a disc cartridge according to the present invention comprises: the frame formed by integrating the first and second frames disposed opposite to each other and the connection member for connecting the base portions of the first and second frames to each other; and the cover formed by integrating the first and second cover plates which are inserted into the space between the first and second frames to be opposite to each other and the connecting cover member for connecting the base portions of the first and second cover plates. Therefore, the frame and the cover can be made of optimum materials. The frame is made of the synthetic resin having excellent impact resistance as compared with the cover. The cover is made of the synthetic resin having light permeability. Therefore, an accommodating case suitable to accommodate the disc cartridge can be manufactured with a lowest cost.

The first and second cover plates of the cover have the insertion portions formed on the two opposite side portions. The insertion portions are inserted into the pair of the first and second insertion grooves provided for the opposite surfaces of the first and second frames from the insertion end portions. The engaging means provided for the insertion portions and the first and second frames are engaged to one another so that the first and second cover plate are joined to the frame. Therefore, the assembly process can easily be completed.

Moreover, the connection cover members are provided for the base portions of the first and second cover plates of the cover which is joined to the frame to constitute the accommodating case. The connection cover members are brought into contact with the connection member of the frame when the first and second cover plates have been inserted into the space between the first and second frames. Therefore, the first and second cover plates can reliably be joined to the cover.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A case for accommodating a disc cartridge comprising:

a frame formed by integrating first and second frames disposed opposite to each other and a connection member for connecting the base portions of said first and second frames to each other;

a cover formed by integrating first and second cover plates which are inserted into a space between said first and second frames to be opposite to each other and a connecting cover member for connecting the base portions of said first and second cover plates to each other;

pairwise first and second parallel insertion grooves provided for opposite surfaces of said first and second frames and formed in the lengthwise direction of said first and second frames such that said first and second insertion grooves are opened at positions adjacent to the base portions of said first and second frames and provided with insertion limiting portions formed adjacent to the leading ends of said first and second frames;

insertion portions provided for two opposite sides of said first and second cover plates so as to be inserted and engaged to said first and second insertion grooves;

engaging means incorporating opposite engaging projections and engaging holes which are arranged to be engaged to one another and which are provided for insertion portions and said first and second frames, respectively, said insertion portions being formed on the two opposite sides of said first and second cover plates and arranged to be inserted and engaged to said first and second insertion grooves; and cartridge holding portions provided for the opposite surfaces of said first and second frames, wherein said first and second cover plates are joined to a space between said first and second frames by inserting said two opposite insertion portions formed on the two sides of said first and second cover plates and by bringing said engaging means of said insertion portions and said first and second frames to be positioned opposite to one another so as to be engaged to one another, and said connection cover member provided adjacent to the base portions of said first and second cover plates covers said connection member when said first and second cover plates have been inserted into the space between said first and second frames.

2. A case for accommodating a disc cartridge according to claim 1, wherein a plurality of said engaging means are provided for said insertion portions and said first and second frames in a direction in which said first and second cover plates are inserted into said first and second frames.

3. A case for accommodating a disc cartridge according to claim 1, wherein said engaging projections constituting said engaging means provided for said insertion portions and said first and second frames are provided for said insertion portions, first engaging guide portions are formed at the leading ends of said first and second cover plates in the direction in which said first and second cover plates are inserted, and first separation preventive walls are provided for the base portions of said first and second cover plates, said base portions being opposite to the direction of insertion.

4. A case for accommodating a disc cartridge according to claim 3, wherein said engaging projections provided for said insertion portions are provided for the surfaces of said insertion portions which are in parallel with the outer surfaces of said first and second cover plates, and said engaging holes arranged to be engaged to said engaging projections are provided for outer plan walls which constitute said first and second insertion grooves, second engaging guide portions are formed on the sides of said first and second cover plates having said engaging projections so as to guide relative engagement between said engaging projections and said engaging holes in a direction perpendicular to the direction in which said first and second cover plates are inserted into said frame, and second separation preventive walls are formed on the sides opposite to the sides on which said second engaging guide portions are formed.

5. A case for accommodating a disc cartridge according to claim 1, wherein said connection member of said frame is formed to exert force for urging said first and second cover plates in a direction opposite to the direction of insertion of said first and second cover plates which have been joined to said frame by engaging said engaging means provided between said insertion portions and said first and second frames to each other.

6. A case for accommodating a disc cartridge according to claim 1, wherein a stepped portion is provided for an outer surface of each of said first and second cover plate so that the thickness of each of said insertion portions is smaller than the thickness of each of said first and second cover plates.

7. A case for accommodating a disc cartridge according to claim 1, wherein a stepped portion is provided for each of opposite side ends of said connection member of said frame, said stepped portion having a thickness which is substantially the same as the thickness of each of said first and second cover plates which are inserted into a space between said first and second frames.

8. A case for accommodating a disc cartridge according to claim 1, wherein cartridge holding grooves for holding two opposite side surfaces of a disc cartridge which is accommodated in said case for accommodating a disc cartridge in the lengthwise direction of said first and second frames are formed in the opposite surfaces of said first and second frames, and said cartridge holding portions are formed in said cartridge holding grooves.

9. A case for accommodating a disc cartridge according to claim 1, wherein said case for accommodating a disc cartridge is arranged to have a space which is arranged to accommodate printed matter and which is created at least between either of said first cover plate or said second cover plate and said disc cartridge after said disc cartridge has been accommodated in said case for accommodating a disc cartridge such that the two side surfaces of said disc cartridge are held in said cartridge holding grooves.

10. A case for accommodating a disc cartridge according to claim 1, wherein a support-means insertion groove for enabling support means of an accommodating apparatus to be engaged is formed in the outer side surface of each of said first and second frames in the lengthwise direction of said first and second frames.

11. A case for accommodating a disc cartridge according to claim 10, wherein said cartridge holding portions are formed by providing portions expanded in opposite directions for portions of side walls of said first and second frames, and recesses formed opposite to said expanded portions are used as engaging portions for engaging and holding portions provided for said accommodating apparatus.

12. A case for accommodating a disc cartridge according to claim 1, wherein said frame is made of a synthetic resin having impact resistance superior to that of said first and second cover plates.

13. A case for accommodating a disc cartridge according to claim 12, wherein at least either of said first and second cover plates made of a synthetic resin having light permeability.

14. A case for accommodating a disc cartridge according to claim 1, wherein a portion on which a label is applied is provided for the outer surface of said connection member of said cover.

* * * * *